US008363874B2

(12) United States Patent
Grell et al.

(10) Patent No.: US 8,363,874 B2
(45) Date of Patent: Jan. 29, 2013

(54) RECEIVER

(75) Inventors: Axel Grell, Burgdorf (DE); Markus Kuhr, Singapore (SG); Axel Bergmeier, Wietze (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 177 days.

(21) Appl. No.: 12/811,206

(22) PCT Filed: Jan. 5, 2009

(86) PCT No.: PCT/EP2009/050046

§ 371 (c)(1), (2), (4) Date: Sep. 28, 2010

(87) PCT Pub. No.: WO2009/087129

PCT Pub. Date: Jul. 16, 2009

(65) Prior Publication Data

US 2011/0007930 A1 Jan. 13, 2011

(30) Foreign Application Priority Data

Jan. 4, 2008 (DE) ......................... 10 2008 003 248

(51) Int. Cl.
*H04R 25/00* (2006.01)
*H04M 1/00* (2006.01)
*H04M 9/00* (2006.01)

(52) U.S. Cl. ......................... 381/372; 381/382; 379/430

(58) Field of Classification Search .................. 381/160, 381/346, 371, 372, 373

See application file for complete search history.

(56) References Cited

U.S. PATENT DOCUMENTS 4,027,116 A * 5/1977 Nakamura .................... 381/346
5,555,554 A * 9/1996 Hofer et al. .................... 381/371
6,282,287 B1 8/2001 Lin
7,391,878 B2 * 6/2008 Liao .............................. 381/370
7,436,973 B2 * 10/2008 Liao .............................. 381/370

FOREIGN PATENT DOCUMENTS

WO WO 97/00592 A 1/1997
WO WO 2007/010458 A 1/2007

OTHER PUBLICATIONS

International Search Report for PCT Application No. PCT/EP2009/050046 mailed on Apr. 8, 2009; 2 pages.
Written Opinion PCT Application No. PCT/EP2009/050046 mailed on Apr. 8, 2009; 3 pages.

* cited by examiner

*Primary Examiner* — Fan Tsang
*Assistant Examiner* — Phylesha Dabney
(74) *Attorney, Agent, or Firm* — Kilpatrick Townsend & Stockton LLP

(57) ABSTRACT

There is provided an earphone having at least one housing (10) and at least one electroacoustic transducer (20) having a first and a second surface (21, 22). The earphone further has a first volume (100) defined by the first surface (21) of the electroacoustic transducer (20) and by a first end (12) of the housing (10), and a second volume (200) defined by the second surface (22) of the electroacoustic transducer (20) and by a second end (11) of the housing (10). An opening (300) is provided between the first and second volumes (100, 200). A closing unit (30) serves to at least partially close the opening (300).

5 Claims, 7 Drawing Sheets

RECEIVER

CROSS-REFERENCE TO RELATED APPLICATIONS

Figure 1:
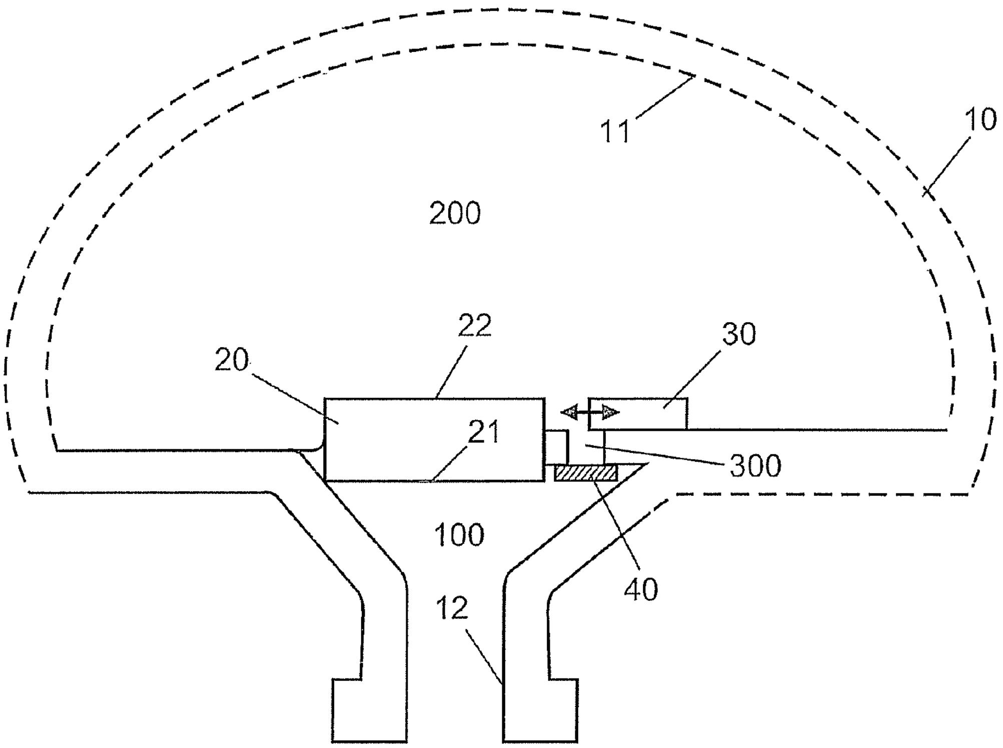

This application is a U.S. National Stage of PCT Application No. PCT/EP2009/050046 filed Jan. 5, 2009, which claims the benefit of German Application No. 102008003248.4 filed Jan 4, 2008, the contents of both applications hereby incorporated by reference in their entirety for all purposes.

The present invention concerns a receiver or earphone.

Ear pieces such as for example in-ear earphones, earphones or headphones typically involve a fixed setting for the acoustic properties of the earphone. However users often want to be able themselves to alter the acoustic settings of the earphone.

WO 97/00592 discloses a headset having acoustic properties which are adjustable by the user. In that case the earphone has a housing with an electroacoustic transducer. Openings are provided in the housing at the side towards the ear. In addition an opening can be provided between the external volume and the rearward volume between the electroacoustic transducer and the housing, and an opening can be provided between the rearward volume and the front volume. Those openings can either be completely closed or completely opened by turning an adjusting element.

Accordingly an object of the present invention is to provide an earphone which has an improved adjustment option for the acoustic properties of the earphone.

That object is attained by an earphone as set forth in claim 1.

There is provided an earphone having at least one housing and at least one electroacoustic transducer having a first and a second surface. The earphone further has a first volume defined by the first surface of the electroacoustic transducer and by a first end of the housing, and a second volume defined by the second surface of the electroacoustic transducer and by a second end of the housing. An opening is provided between the first and second volumes. A closing unit serves to at least partially close the opening.

The invention concerns the idea of providing a earphone having a housing and an electroacoustic transducer therein, wherein the transducer has a first and a second surface. The housing is divided by the transducer into a first volume and a second volume. The first volume extends between the first surface of the transducer and the inside of the earphone on the side towards the ear. The second volume is defined by the second surface of the transducer and by the housing facing away from the ear. In addition provided between the first and second volumes is an opening which can be at least partially closed by a closing unit. In that respect the closing unit is so designed that it can continuously alter the degree of opening.

In accordance with an aspect of the invention there is provided a damping element at the opening.

By opening or closing the closing unit it is possible to control the acoustic resistance between the front and rear sides of the transducer and in particular it is possible to control the low-frequency properties. The closing unit can be actuated by the user. By virtue of the provision of the damping unit, it is possible to define the acoustic impedance of the bypass or the opening. In dependence on the position of the closing unit, the sound pressure within the transmission tube and the ear canal can be reduced or increased. When the closing unit is opened a low bass response can be produced. When however the closing unit is closed then an increased bass response can be obtained.

The closing unit can be in the form of a slider or alternatively in the form of a rotatable disk, by means of which the opening can be continuously closed. The opening can be at least partially closed by means of a rotary movement.

Further aspects of the invention are subject-matter of the appendant claims.

Embodiments by way of example and advantages of the invention are described in greater detail hereinafter with reference to the drawing.

Figure 2:
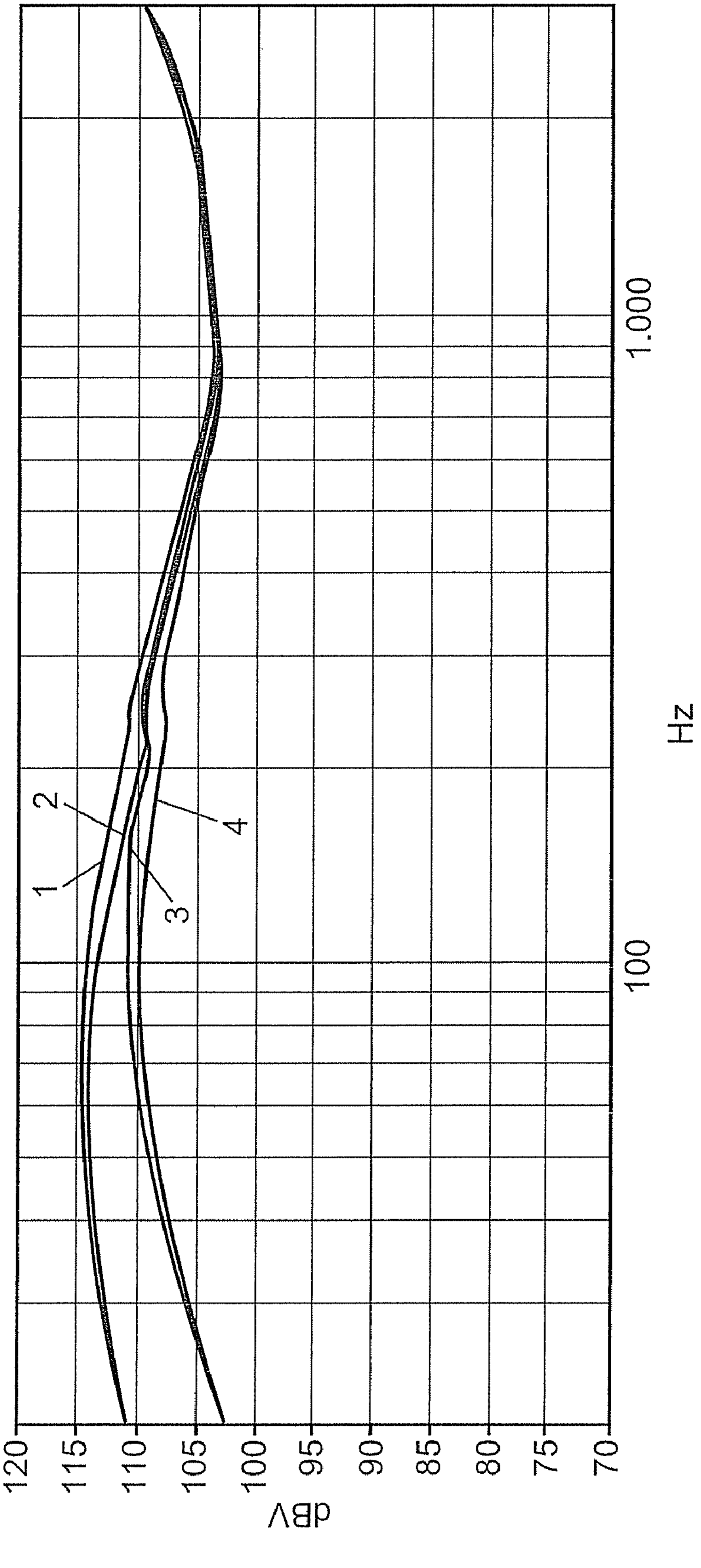
Figure 3:
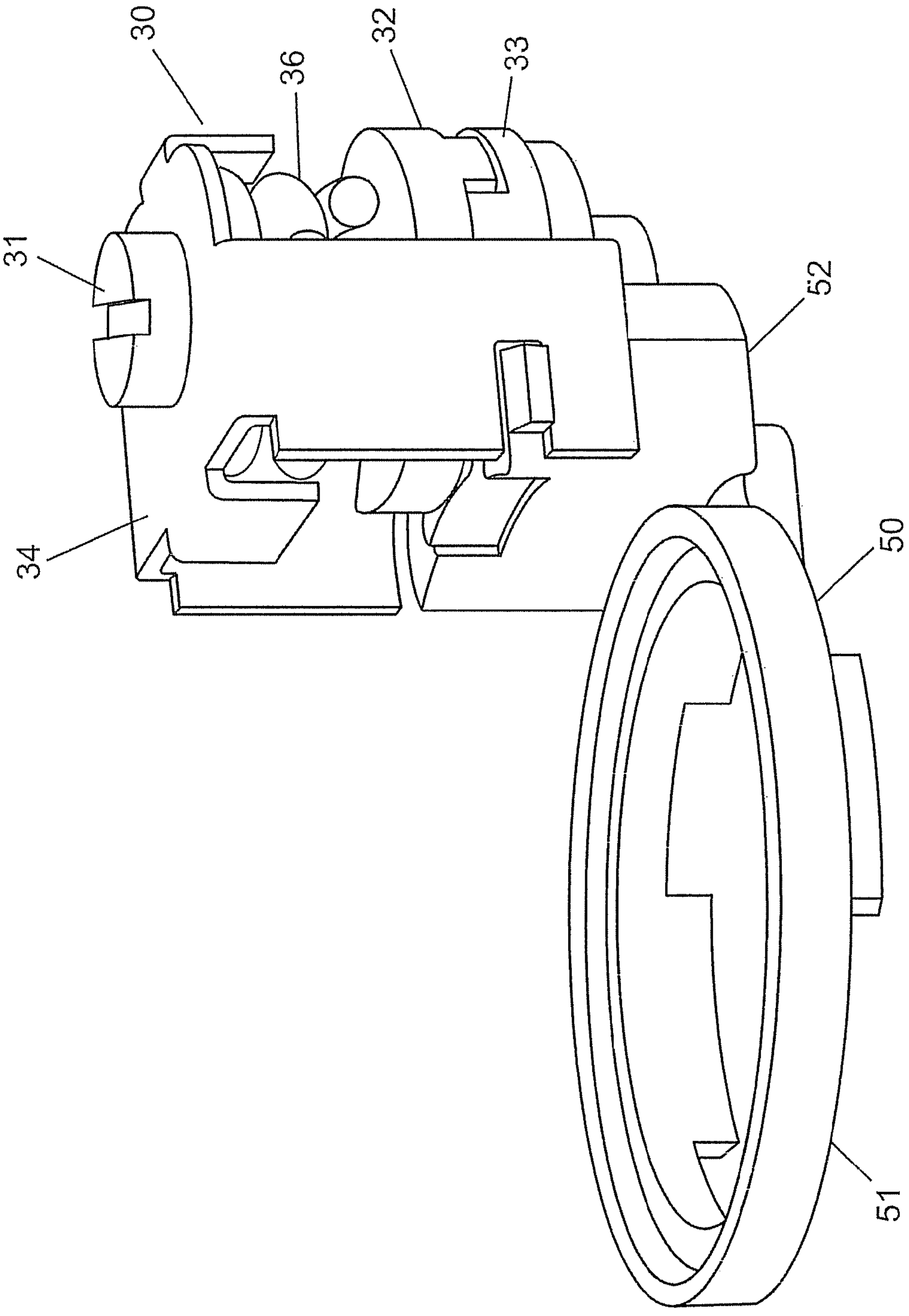
Figure 4:
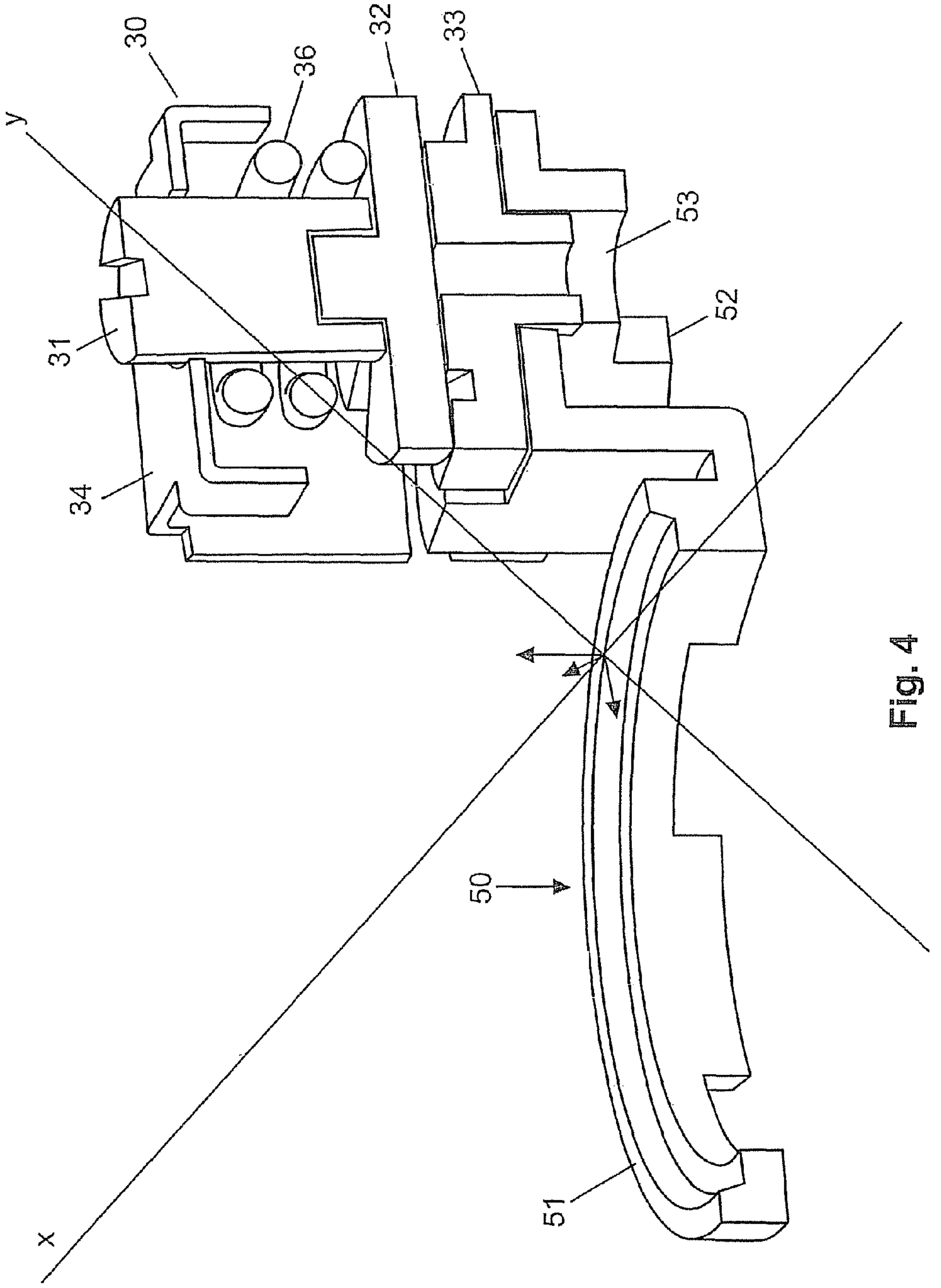
Figure 5:
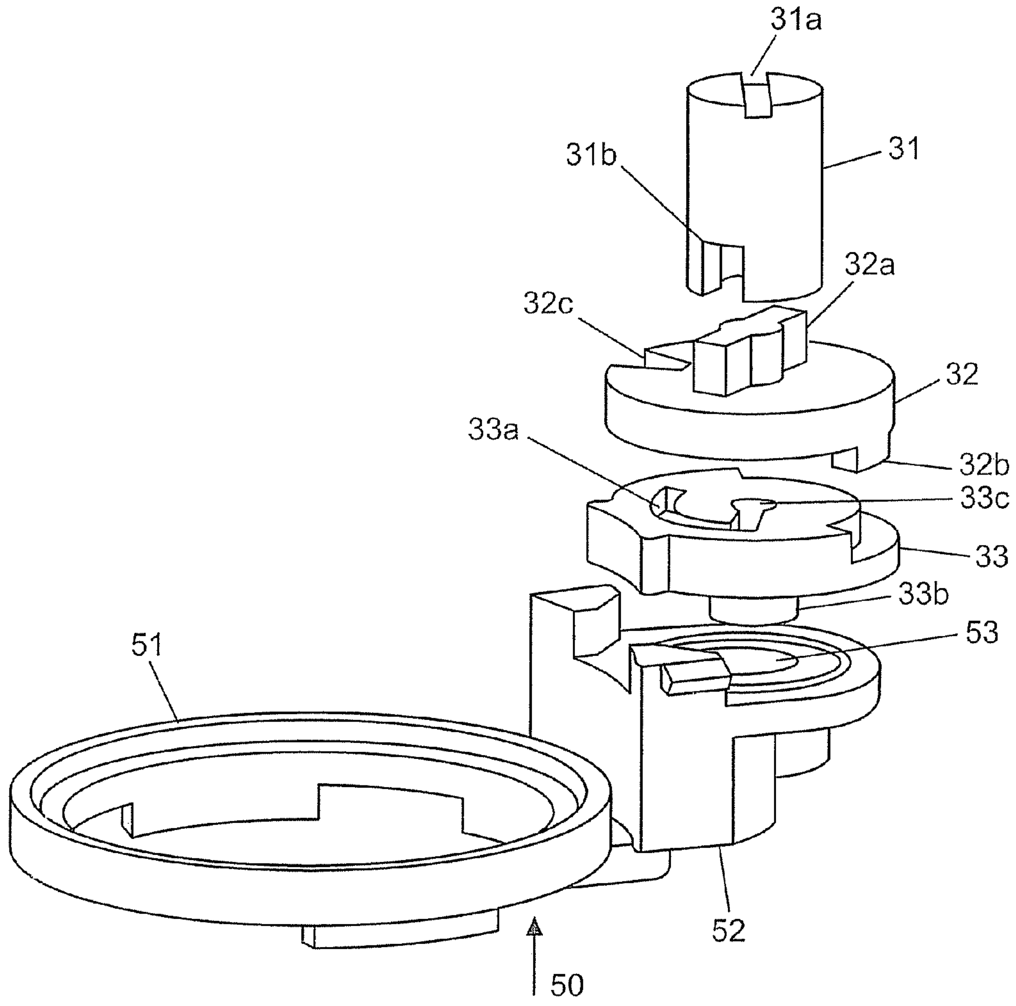
Figure 6:
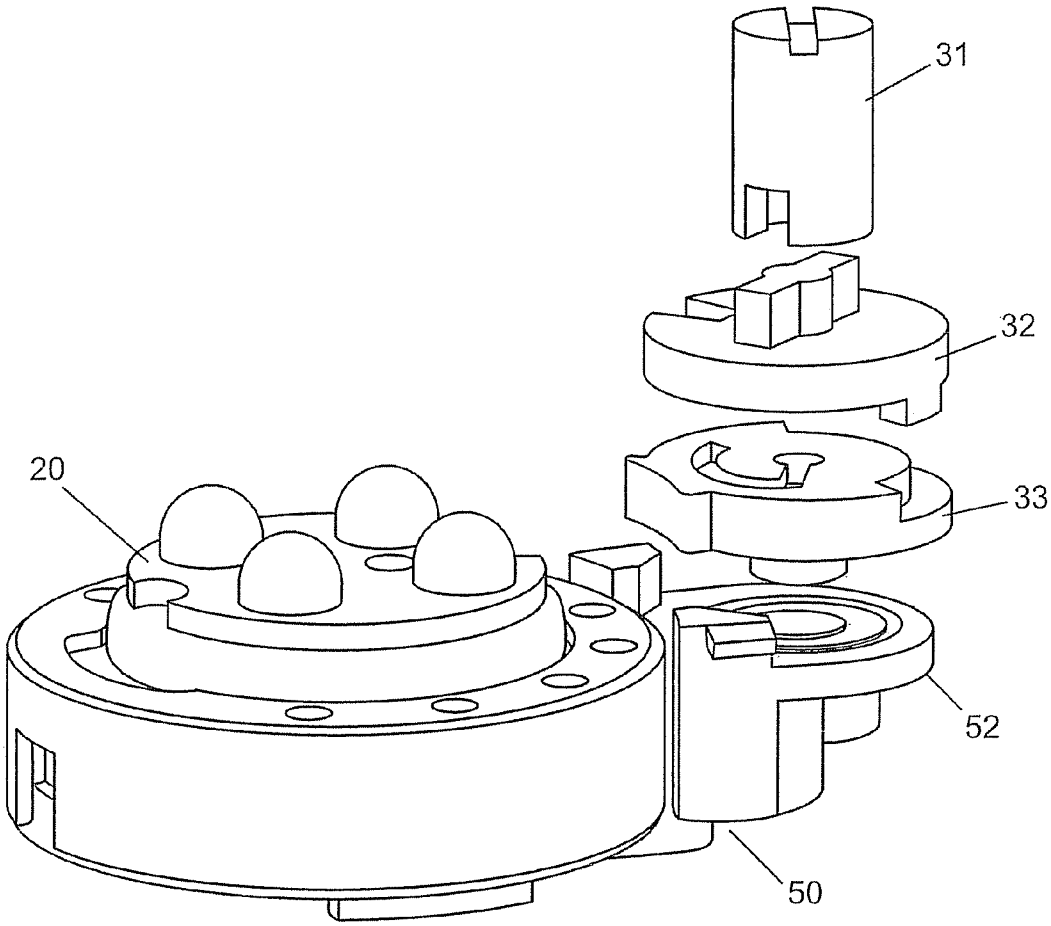
Figure 7:
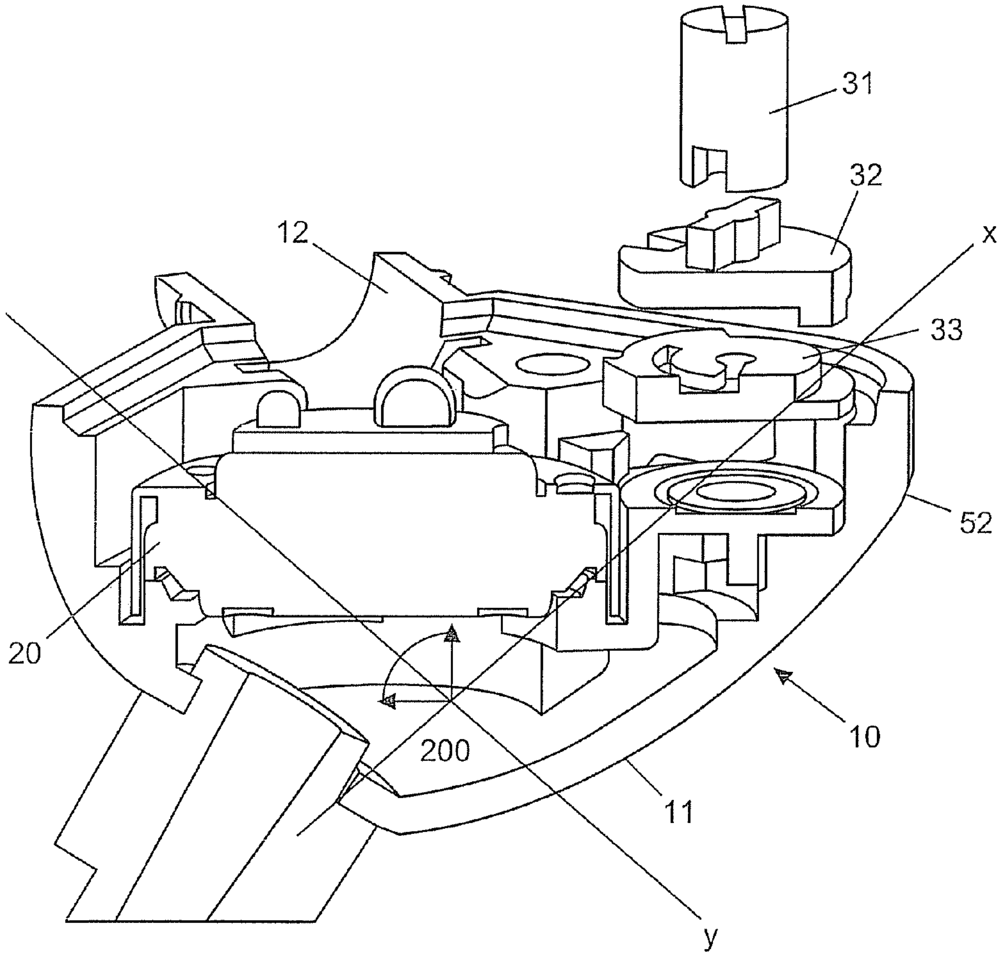

FIG. 1 shows a diagrammatic view of an earphone in accordance with a first embodiment, FIG. 2 shows a graph of a frequency response characteristic of the earphone in accordance with the first embodiment, FIG. 3 shows a perspective view of a part of an earphone with a closing unit in accordance with a second embodiment, FIG. 4 shows a perspective sectional view of the part of the earphone of FIG. 3, FIG. 5 shows a perspective view of the closing unit in accordance with the second embodiment, FIG. 6 shows a further perspective view of the closing unit in accordance with the second embodiment, and FIG. 7 shows a diagrammatic sectional view of an earphone according to a second embodiment.

FIG. 1 shows a diagrammatic view of an earphone according to the first embodiment. The earphone according to the first embodiment is in particular in the form of an in-ear earphone. The earphone has a housing 10 having a first end 12 towards the ear and a second end 11 remote from the ear. The earphone further has an electroacoustic transducer 20 having a first surface 21 and a second surface 22. The electroacoustic transducer 20 is disposed between a first volume 100 and a second volume 200. An opening 300 connects the first and second volumes 100, 200. A closing unit 30 is provided to at least partially close the opening 300. Closure of the opening 300 can in that case be effected continuously, that is to say by means of the closing unit 30 the opening 300 can also be only partially closed or the degree of opening of the opening can be adjusted. In that respect the closing unit 30 can be actuated by the user.

Optionally a damping unit 400 can be provided in front of the opening 300. The first volume 100 is delimited by the first surface 21 of the electroacoustic transducer 20 and by the first end 12 of the housing. The second volume 200 is delimited by the second surface 22 of the electroacoustic transducer 20 and by the second end 11 of the housing.

Thus a sound wall (with an electroacoustic transducer) is provided between the first and second volumes, which has a closing unit 30 in order thereby to be able to at least partially close an opening or a bypass 300. In that way the acoustic resistance between the first and second volumes 100, 200 can be increased. The acoustic resistance can be reduced by displacement of the closing unit. In that way increased extinction can occur in the low-frequency range and the reproduced frequency response characteristic can be poorer in bass.

The earphone according to the invention means that the user or the person employing it has the option of altering the response characteristic of the earphone. No electronic components are required for that purpose as that can be implemented for example by a closing unit 30. The closing unit 30 can be embodied for example by a slider. Alternatively or additionally the closing unit can be so designed that the opening can be at least partially closed by means of a rotary movement.

FIG. 2 shows a graph of a frequency response characteristic of the earphone according to the first embodiment. FIG. 2 shows four frequency response characteristics. The frequency response characteristics 1 and 2 represent the frequency response characteristics when the bypass 300 is closed or open. Particularly in the range between 100 and 300 Hz, it is possible to see the differences between the bypass when opened and closed. The frequency response characteristics 3 and 4 also represent those with the bypass closed and opened.

In accordance with a further embodiment there is provided a headset based on the earphone in accordance with the first embodiment.

FIG. 3 shows a perspective view of a part of an earphone according to the second embodiment. In this case FIG. 3 shows a capsule holder 50 and a closing unit 30. The capsule holder has a first end 51 and a second end 52 having a hole 53. The first end 51 of the capsule holder 50 serves to receive an earphone capsule and the closing unit 30 is provided at the second end 52. The closing unit 30 can in that case have a screw 31, a first element or a cover element 32, a second element or a bass tube element 33, a housing 34 and optionally a spring 36 between the housing 34 and the cover element 32.

FIG. 4 shows a diagrammatic sectional view of the part of the earphone in accordance with the second embodiment of FIG. 3. Thus FIG. 4 shows the capsule holder 50 with the first end 51 and the second end 52, with an opening or a hole 53 being provided in the second end 52. The Figure further shows the closing unit 30. The closing unit 30 has a screw 31, a first element or a cover element 32, a second element 33 or a bass tube element 33, a housing 34 and optionally a spring 36. The Figure further shows an x-axis and a y-axis.

FIG. 5 shows a perspective view of a part of an earphone in accordance with a second embodiment. In this case the capsule holder 50 is shown, having the first end 51 for receiving an earphone capsule and a second end 52 with a hole 53. In addition the Figure shows parts of the closing unit 30, namely the screw 31, the first element 32 and the second element 33. The screw 31 has a first end 31*a* and a second end 31*b*. The second end 31*b* has a recess 31*b*. The first element 32 is in the form of a cover element and has a first end 32*a* having a projection 32*a* and a second end 32*b* having a nose 32*b*. The cover element further has an aperture or a hole 32*c*. The second element 33 can optionally be in the form of a bass tube element. For that purpose the second element 33 has a through hole 33*c* and an optionally (semicircular) aperture 33*a*. The aperture 33*a* is connected to the through hole 33*c*. Provided on the other side of the second element 33 is a projection which can be inserted into the hole 53.

FIG. 6 shows a further diagrammatic view of a part of the earphone in accordance with the second embodiment. In this case the view in FIG. 6 substantially corresponds to that shown in FIG. 5. In addition however there is a transducer capsule 20 in the first end 51 of the capsule holder 50.

FIG. 7 shows a diagrammatic sectional view of an earphone in accordance with the second embodiment. The earphone has a housing 10 having a first end 11 and a second end 12. The Figure further shows a capsule holder 50 having a transducer capsule 20 at its first end 51 and a closing unit 30 at the second end 52 of the capsule holder. In this case the transducer capsule 12 is provided between the first and second ends 11, 12 of the housing so that there is a first volume 100 between a first side of the transducer capsule and the second end 12 of the housing and a second volume 200 between the second side of the transducer capsule and the first end 11 of the housing. In this case the closing unit preferably has a screw 32 and the first and second elements 32, 33. The closing unit can further have the elements or units shown in FIGS. 3 through 6. The Figure also shows an x-axis and a y-axis.

In accordance with the second embodiment the closing unit 30 at least partially acts on the basis of the principle of a bass tube, wherein the front volume 100 is connected by way of the hole 53 into the capsule holder 50 to the rear volume 200. The length of the bass tube can be provided by the second element 33, in particular by means of the through hole 33 and the aperture 33*a*. The length of the bass tube can be varied by the first element 32 and the aperture or hole 32*c* thereof, which is over the aperture 33*a*, by rotation of the first element 32 or by rotation of the screw 31. The design configuration of the sliding unit in accordance with the second embodiment is advantageous as that can provide a bass tube of variable length in an extremely small space.

The screw can optionally be actuated from outside the housing so that a user can adjust the bass reproduction himself (from the outside).

The invention claimed is:

1. An earphone comprising:

at least one housing, at least one electroacoustic transducer having a first surface and a second surface, a first volume defined by the first surface of the electroacoustic transducer and by a first end of the at least one housing in the earphone, a second volume defined by the second surface of the electroacoustic transducer and by a second end of the at least one housing, an opening between the first and second volumes, and a closing unit for at least partially closing the opening, the closing unit having a bass tube element and a rotatable cover unit, a portion of a first end of the bass tube element being exposed to the first volume through an aperture in the cover unit, a portion of a second end of the bass tube element being exposed to the second volume through the opening, a length of the bass tube element being variable by rotation of the cover unit, wherein the bass tube element has a through hole and an aperture which are connected together, and wherein a position of the aperture of the cover unit relative to the aperture of the bass tube element is variable by rotation of the cover unit.

2. An earphone as set forth in claim 1 wherein the closing unit is adapted to adjust the degree of opening of the opening.

3. An earphone as set forth in claim 1 and further comprising a damping unit in front of the opening.

4. An earphone as set forth in claim 1 wherein the closing unit is actuable by a user of the earphone.

5. A headset comprising:

at least one housing, at least one electroacoustic transducer having a first surface and a second surface, a first volume defined by the first surface of the electroacoustic transducer and by a first end of the at least one housing in the headset, a second volume defined by the second surface of the electroacoustic transducer and by a second end of the at least one housing, an opening between the first and second volumes, and a closing unit for at least partially closing the opening, the closing unit having a bass tube element and a rotatable cover unit, a portion of a first end of the bass tube element being exposed to the first volume through an aperture in the cover unit, a portion of a second end of the bass tube element being exposed to the second volume through the opening, a length of the bass tube element being variable by rotation of the cover unit, wherein the bass tube element has a through hole and an aperture which are connected together, and wherein a position of the aperture of the cover unit relative to the aperture of the bass tube element is variable by rotation of the cover unit.

* * * * *

UNITED STATES PATENT AND TRADEMARK OFFICE

CERTIFICATE OF CORRECTION

PATENT NO. : 8,363,874 B2
APPLICATION NO. : 12/811206
DATED : January 29, 2013
INVENTOR(S) : Grell et al.

It is certified that error appears in the above-identified patent and that said Letters Patent is hereby corrected as shown below:

In the Specification:

In column 1, line 42, please delete “a earphone” and insert --an earphone--.

In column 2, line 9, please delete “drawing” and insert --drawings--.

In column 2, line 40, please delete “400” and insert --40--.

In column 3, line 35, please delete “recess 31b” and insert --recess--.

In column 3, line 37, please delete “projection 32a” and insert --projection--.

In column 3, line 37, please delete “nose 32b” and insert --nose--.

In column 3, line 61, please delete “screw 32” and insert --screw 31--.

Signed and Sealed this
Fourteenth Day of May, 2013

Teresa Stanek Rea
*Acting Director of the United States Patent and Trademark Office*